United States Patent
Hartman et al.

(10) Patent No.: US 6,907,315 B1
(45) Date of Patent: Jun. 14, 2005

(54) METHOD AND SYSTEM FOR DISPLAYING AND EDITING OF INFORMATION

(75) Inventors: Peri Hartman, Seattle, WA (US); John Gehlen, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 28 days.

(21) Appl. No.: 10/445,285

(22) Filed: May 22, 2003

Related U.S. Application Data

(63) Continuation of application No. 08/928,555, filed on Sep. 12, 1997, now Pat. No. 6,615,226.

(51) Int. Cl.[7] .......................... G06F 7/00; G06F 17/60
(52) U.S. Cl. ...................................... 700/216; 705/26
(58) Field of Search ............................. 700/216, 219; 705/26, 27, 28; 707/3, 4, 10, 513

(56) References Cited

U.S. PATENT DOCUMENTS

| | | |
|---|---|---|
| 4,734,858 A | 3/1988 | Schlafly |
| 4,739,310 A | 4/1988 | Yamamoto |
| 4,937,863 A | 6/1990 | Robert et al. |
| 5,204,897 A | 4/1993 | Wyman |
| 5,208,748 A | 5/1993 | Flores |
| 5,260,999 A | 11/1993 | Wyman |
| 5,303,393 A | 4/1994 | Noreen |
| 5,448,633 A | 9/1995 | Jamaleddin |
| 5,451,998 A | 9/1995 | Hamrick |
| 5,515,268 A | 5/1996 | Yoda |
| 5,583,937 A | 12/1996 | Ullrich |
| 5,611,040 A | 3/1997 | Brewer |
| 5,621,456 A | 4/1997 | Florin |
| 5,627,940 A | 5/1997 | Rohra et al. |
| 5,640,501 A | 6/1997 | Turpin |
| 5,640,577 A | 6/1997 | Scharmer |
| 5,646,992 A | 7/1997 | Subler |
| 5,664,111 A | 9/1997 | Nahan et al. |
| 5,666,493 A | 9/1997 | Wojcik et al. |
| 5,675,507 A | 10/1997 | Bobo |
| 5,692,132 A | 11/1997 | Hogan |
| 5,704,029 A | 12/1997 | Wright |
| 5,708,780 A | 1/1998 | Levergood |

(Continued)

FOREIGN PATENT DOCUMENTS

| | | |
|---|---|---|
| CA | 2222229 | 7/1998 |
| EP | 0 855 659 | 1/1998 |

(Continued)

OTHER PUBLICATIONS

Microsoft for Windows Feature Guide, Version 1.0, 1990, Microsoft Corporation, Dec. 1990 (pp. 54–55).

(Continued)

*Primary Examiner*—Gene O. Crawford
(74) *Attorney, Agent, or Firm*—Perkins Coie LLP

(57) ABSTRACT

A method and system for placing an order to purchase an item via the Internet. The order is placed by a purchaser at a client system and received by a server system. The server system receives purchaser information including identification of the purchaser, payment information, and shipment information from the client system. The server system then assigns a client identifier to the client system and associates the assigned client identifier with the received purchaser information. The server system sends to the client system the assigned client identifier and an HTML document identifying the item and including an order button. The client system receives and stores the assigned client identifier and receives and displays the HTML document. In response to the selection of the order button, the client system sends to the server system a request to purchase the identified item. The server system receives the request and combines the purchaser information associated with the client identifier of the client system to generate an order to purchase the item in accordance with the billing and shipment information whereby the purchaser effects the ordering of the product by selection of the order button.

16 Claims, 11 Drawing Sheets

U.S. PATENT DOCUMENTS

| | | | |
|---|---|---|---|
| 5,710,887 | A | 1/1998 | Chelliah |
| 5,715,314 | A | 2/1998 | Payne et al. |
| 5,715,399 | A | 2/1998 | Bezos |
| 5,719,941 | A | 2/1998 | Swift |
| 5,724,424 | A | 3/1998 | Gifford |
| 5,727,163 | A | 3/1998 | Bezos |
| 5,745,681 | A | 4/1998 | Levine et al. |
| 5,758,048 | A | 5/1998 | Greulich et al. |
| 5,758,126 | A | 5/1998 | Daniels et al. |
| 5,778,240 | A | 7/1998 | Buchman et al. |
| 5,778,367 | A | 7/1998 | Wesinger et al. |
| 5,794,006 | A | 8/1998 | Sanderman |
| 5,805,159 | A | 9/1998 | Bertram et al. |
| 5,805,881 | A | 9/1998 | Kiuchi et al. |
| 5,815,665 | A | 9/1998 | Teper |
| 5,826,242 | A | 10/1998 | Montulli |
| 5,835,724 | A | 11/1998 | Smith |
| 5,862,325 | A | 1/1999 | Reed et al. |
| 5,867,667 | A | 2/1999 | Butman et al. |
| 5,870,716 | A | 2/1999 | Sugiyama |
| 5,870,717 | A | 2/1999 | Wiecha |
| 5,890,137 | A | 3/1999 | Koreeda |
| 5,890,175 | A | 3/1999 | Wong et al. |
| 5,897,622 | A | 4/1999 | Blinn |
| 5,899,980 | A | 5/1999 | Wilf |
| 5,905,942 | A | 5/1999 | Stoel |
| 5,909,492 | A | 6/1999 | Payne |
| 5,960,411 | A * | 9/1999 | Hartman et al. ............... 705/26 |
| 5,963,915 | A | 10/1999 | Kirsch |
| 5,963,924 | A | 10/1999 | Williams |
| 5,970,472 | A | 10/1999 | Allsop |
| 5,973,692 | A | 10/1999 | Knowlton |
| 5,974,418 | A | 10/1999 | Blinn |
| 5,983,199 | A | 11/1999 | Kaneko |
| 5,991,739 | A | 11/1999 | Cupps |
| 5,995,626 | A | 11/1999 | Nishioka |
| 5,999,914 | A | 12/1999 | Blinn |
| 6,009,413 | A | 12/1999 | Webber |
| 6,026,376 | A | 2/2000 | Kenney |
| 6,035,283 | A | 3/2000 | Rofrano |
| 6,058,373 | A | 5/2000 | Blinn |
| 6,101,482 | A | 8/2000 | DiAngelo |
| 6,101,483 | A | 8/2000 | Petrovich |
| 6,112,201 | A | 8/2000 | Wical |
| 6,154,738 | A * | 11/2000 | Call ............................ 705/26 |
| 6,167,378 | A | 12/2000 | Webber |

FOREIGN PATENT DOCUMENTS

| | | |
|---|---|---|
| EP | 0 855 687 | 1/1998 |
| EP | 0845747 | 6/1998 |
| EP | 0883076 | 12/1998 |
| JP | 2-207645 | 8/1990 |
| JP | 06-068106 | 3/1994 |
| JP | 09-006849 | 1/1997 |
| JP | 09-114783 | 5/1997 |
| JP | 09-138725 | 5/1997 |
| JP | 09-179912 | 7/1997 |
| JP | 09-220882 | 8/1997 |
| WO | WO95/16971 | 6/1995 |
| WO | WO-95/30961 | 11/1995 |
| WO | WO96/13013 | 5/1996 |
| WO | WO96/17466 | 6/1996 |
| WO | WO-96/34491 | 10/1996 |
| WO | WO96/36928 | 11/1996 |
| WO | WO96/38799 | 12/1996 |
| WO | WO-98/21679 | 5/1998 |

OTHER PUBLICATIONS

The Windows Interface: An Application Design Guide, Chapters 6, 7 and 8, Microsoft Corporation, 1992 (pp. 101–163).

Wasserman, Elizabeth, "Close is Enough to Earn Amazon's Bounty," PC World, Mar. 16, 2001 (2 pages). http://www.pcworld.com/resource/printable/article/0, aid, 44702, 00.asp [Accessed Dec. 22, 2003].

"The Web Maestro: An Interview with Tim Berners–Lee," Technology Review, Jul. 1996 (11 pages).

Ketchpel, Steven, P., et al., "Shopping Models: A Flexible Architecture for Information Commerce," Proceedings of the 2nd ACM International Conference on Digital Libraries, Jul. 25–28, 1997, Philadelphia, PA (10 pages).

Swift, Tammy, "The Everchanging Marketplace: From the Neighborhood Grocery to the Hyperstores of Today," The Forum, Aug. 18, 1999 (7 pages).

Tarsala, Mike, Open TV Claims 'One Click' Technology Rights, CBS MarketWatch, Oct. 5, 2000 (1 page).

Online Minivend Reference Guide–Multi–Catalog Shopping Cart and Mall, Mar. 14, 1997 (194 pages).

Bounty Quest, 1–Click Prior Art (8 pages). http://web.archive.org/web/20010405100818/www.bountyquest.com/ptentinfo/oneclickart.

Godbey, Robert, "The Law of the Line, The Pros and Cons of Patents," Hawaii Business, Aug. 2001.

Acme Computers (25 pages). http://morwood.arl.wustl.edu/web–basket/acme.

Oliver's Market, The Ordering System (26 pages). http://www.sonic.net/~raptor/curent/how2ordr.html.

Web–Basket, Accessed Oct. 24, 1999 (5 pages). http://morwood.arl.wustl.edu/web–basket/.

Doonesbury Comics, May 2, 1993 through May 8, 2003 (6 pages). http://www.doonesbury.com/flashbacks/pages/1993/05/3b930505.1.

Email from Shel Kaphan to www–talk@w3.org, Aug. 10, 1996 (2 pages).

Freed, Ken, "When Cable Went Qubist," Interactive Television, Media Visions.

Webzine/Warner's Qube, Accessed Oct. 8, 2000 (7 pages). http://www.kenfred.org/itv–qube.html.

Netscape Merchant System, Getting Started, Netscape Communications Corporation, 1996 (100 pages).

Kristol, David M., and Montulli, Lou, "HTTP State Management Mechanism," Jul. 1996 (20 pages). http://portal.research.bell–labs.com/~dmk/cookie–2.29.txt.

Perry, Tekla S., "The Trials and Travails of Interactive TV," IEEE Spectrum, Apr. 1996 (pp. 22–28).

Qube Advertisement (27 pages).

Qube Program Guide, May 1979 (41 pages).

CompServe Classic Service–Company Analyzer Screen Shots, Nov. 11, 1999 (3 pages).

Netscape Merchant System, Site Administrator's Handbook, Netscape Communications Corporation, 1996 (336 pages).

Subscriber Systems Series 8550 Remote Control Unit, Scientific Atlanta, 1996 (pp. 14–59–14–60).

Subscriber Systems, Series 8590 Addressable Home Terminal With Volume Control, Scientific Atlanta, 1996 (pp. 14–37 –14–40).

Yesil, Magdalena, "Creating the Virtual Store," Copyright 1996 (pp. 321–337).

Amazon.com v. BarnesandNoble.com, Inc., United States Court Appeals for the Federal Circuit, 239 F.3d 1343, 2001, Feb. 14, 2001.

Amazon Web Page Containing Product Details of "Creating the Virtual Store," providing publish date Nov. 8, 1996. http://www.amazon.com/exec/obidos/tg/detail/–/0471164941/002–1591836–2687212?vit32 glance, Feb. 26, 2003.

Intellectual Property & Technology Law Journal, "Preliminary Injunction Lifted in "One–Click" Patent Battle," vol. 13, No. 5, May 2001 (2 pages).

"Cookies–What Every Web Designer Should Know," Journal of Design Science, 1997–2001, Ignition, Inc. (7 pages). www.ignitiondesign.com/journal/cookies.

Carroll, Jim and Broadhead, Rick, "1997 Canadian Internet Handbook, "Prentice Hall, 1996 (9 pages).

Yesil, Magdalena, "Creating the Virtual Store,"Wiley Computer Publishing, 1997 (pp. 118–121, 326–327).

Walter's Coke Project Homepage, "Lloyd's Coke Machine," Feb. 27, 1996 (8 pages) http://www.ugcs.caltech.edu/walterfb/coke/coke. html [Accessed Jul. 23, 2001].

Greenspun, Philip, "Philip and Alex's Guide to Web Publishing," Chapter 14: Ecommerce (31 pages) http:www//.arsdigita.com/books/panda/ecommerce.

Telvue Corp. 10–Q Report, Nov. 7, 1995 (18 pages) SEC Info –Telvue Corp –10–Q –For Sep. 30, 1995. http://www.secinfo.com/dpJXs.a6.html [Accessed Jul. 23, 2001].

Cooper, Alan, "About Face –The Essentials of User Interface Design," Chapters 11–15, IDG Books Worldwide, Inc., Foster City, California, Copyright 1995.

Microsoft Word for Windows, User's Guide Version 6.0, First Edition, Jul. 15, 1994, Chapter 23, "Sentence Printing," (pp. 537–556).

Microsoft Excel User's Guide, Version 5.0, 1993.

Bank of Montreal MBANX, "Netbanking With Your PC,"Jul. 7, 1997.

Auction Features –Strickly Exchange Online Acution Software. http://www.auctionhosting.com [Accessed Jul. 23, 2001].

Trommer, Diane, "A New Wave in Online Credit," Electronic Buyers News, Mar. 4, 1996.

Terdoslavich, William, "Java Electronic Commerce Framework," Computer Reseller News, Sep. 23, 2996, CMP Media, Inc., 1996.

"Internet Access: Disc Distributing Announces Interactive World Wide," Cambridge Work–Group Computing Report, Cambridge Publishing, Inc., 1995.

Nance, Barry, "Reviews: A Grand Opening for Virtual Storefront with Middleware," Jun. 1, 1997, CMP Media, Inc.

"G0–CART Shopping Cart Software Features," 1996 GO International, Inc.

PerlShop Manual (version 2.2), 1996, ARPAnet Corp.

Sax Software Announces Sax NetSEll; Sax NetSell's Design–Time ActiveX Control Makes Internet Commerce Easy, 1997, Sax Software Corp.

Jones, Chris, "Java Shopping Cart and Java Wallet; Oracles Plans to Join E–Commerce Initiative," Mar. 31, 1997, InfoWorld Media Group.

"Pacific Coast Software; Software Creates Virtual Shopping Cart," Sep. 6, 1996, MS Communications Ltd. 1996.

"Software Creates Virtual Shopping Cart," Sep. 5, 1996, Business Wire, Inc.

Baron, Christ and Weil, Bob, "Implementing a Web Shopping Cart," Dr. Dobb's Journal, Sep. 1996.

Hoque, Reaz, "A Shopping Cart Application with JavaScript," Web Techniques, May 1998.

Open Buying on the Internet (OBI) Standard Release V1.0, Copyright May 1997, The OBI Consortium.

Elcom, 10–K405 Annual Report Filed May 25, 1997 with the Securities and Exchange Commission, Washington DC, Commission File No. 000–27376 Elcom International, Inc.

Telecom Plus, Supplynet User Manual, Telecom, Australia, 1990.

Supplynet, Requisitioning Training, Oct. 1993, (pp. 1–91).

Supplynet, Remote Requisitioning Systems, Ferntree Computer Corporation.

Australian Purchasing & Supply, The Official Magazine of the Australian Institute of Purchasing & Materials Management, Jul./Aug. 1993.

* cited by examiner

Summary of 1-Click express orders

Press this button if you [changed quantities] of any item below. If you don't press it, your changes won't "stick."

You can set the quantity to 0 (zero) to cancel an item.

The 1-Click order below (available in 3 or fewer days) will be shipped together.

106 {
Order# 098337

| [1] | Item 1 | $ 10.00 |
| [1] | Item 2 | $ 15.00 |
|     | Total  | $ 25.00 |

The 1-Click orders below (available in one week or more) will be shipped together.

107 {
Order# 098336

| [1] | Item 3 | $ 20.00 |
| [1] | Item 4 | $  6.00 |
|     | Total  | $ 26.00 |

108 {
Ship to: John Doe at home

Shipment method: Standard domestic shipping

Payment method: **__*1_2345

[continue shopping]

1-Click express shipping policies

*Fig. 1C*

START

A: Customer Name & Address

B: Customer Financial Info

C: Customer Employment Info

D: Customer Education Info

A: First Name :

M.I. :

Last Name :

Street :

City :

State :    Zip :

[Next] [Previous]

B: Customer Financial Info

C: Customer Employment Info

D: Customer Education Info

A: Customer Name & Address

B: Net Worth: : ☐

Annual Income: : ☐

Spouse's Annual Income: : ☐

Other Income: : ☐

[Next] [Previous]

C: Customer Employment Info

D: Customer Education Info

METHOD AND SYSTEM FOR DISPLAYING AND EDITING OF INFORMATION

CROSS-REFERENCE TO RELATED APPLICATION

This application is a continuation of U.S. patent application Ser. No. 08/928,555 filed on Sep. 12, 1997, now U.S. Pat. No. 6,615,226, the disclosure of which is hereby incorporated by reference in its entirety.

TECHNICAL FIELD

The present invention relates to a computer method and system for placing an order and, more particularly, to a method and system for ordering items over the Internet.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

Since the purchaser-specific order information contains sensitive information (e.g., a credit card number), both vendors and purchasers want to ensure the security of such information. Security is a concern because information transmitted over the Internet may pass through various intermediate computer systems on its way to its final destination. The information could be intercepted by an unscrupulous person at an intermediate system. To help ensure the security of the sensitive information, various encryption techniques are used when transmitting such information between a client computer system and a server computer system. Even though such encrypted information can be intercepted, because the information is encrypted, it is generally useless to the interceptor. Nevertheless, there is always a possibility that such sensitive information may be successfully decrypted by the interceptor. Therefore, it would be desirable to minimize the sensitive information transmitted when placing an order.

The selection of the various items from the electronic catalogs is generally based on the "shopping cart" model. When the purchaser selects an item from the electronic catalog, the server computer system metaphorically adds that item to a shopping cart. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. For example, the purchaser selects the various items from the electronic catalog, and then indicates that the selection is complete. The purchaser is then presented with an order Web page that prompts the purchaser for the purchaser-specific order information to complete the order. That Web page may be prefilled with information that was provided by the purchaser when placing another order. The information is then validated by the server computer system, and the order is completed. Such an ordering model can be problematic for a couple of reasons. If a purchaser is ordering only one item, then the overhead of confirming the various steps of the ordering process and waiting for, viewing, and updating the purchaser-specific order information can be much more than the overhead of selecting the item itself. This overhead makes the purchase of a single item cumbersome. Also, with such an ordering model, each time an order is placed sensitive information is transmitted over the Internet. Each time the sensitive information is transmitted over the Internet, it is susceptible to being intercepted and decrypted.

SUMMARY OF THE INVENTION

An embodiment of the present invention provides a method and system for ordering an item from a client system. The client system is provided with an identifier that identifies a customer. The client system displays information that identifies the item and displays an indication of an action (e.g., a single action such as clicking a mouse button) that a purchaser is to perform to order the identified item. In response to the indicated action being performed, the client system sends to a server system the provided identifier and a request to order the identified item. The server system uses the identifier to identify additional information needed to generate an order for the item and then generates the order.

The server system receives and stores the additional information for customers using various computer systems so that the server system can generate such orders. The server system stores the received additional information in association with an identifier of the customer and provides the identifier to the client system. When requested by the client system, the server system provides information describing the item to the requesting client system. When the server system receives a request from a client system, the server system combines the additional information stored in association with the identifier included in the request to effect the ordering of the item.

An embodiment of the present invention also provides a hierarchical technique for displaying information in a form. Also, an embodiment provides an editing mode in which the contents of a form are displayed and when selected an editing window is presented so that the contents of the field can be edited. After editing, a form is displayed with the edited contents of the field.

BRIEF DESCRIPTION OF THE DRAWINGS

FIGS. 1A–1C illustrate single-action ordering in one embodiment of the present invention.

FIGS. 8A–8C illustrate a hierarchical data entry mechanism in one embodiment.

DETAILED DESCRIPTION OF THE INVENTION

The present invention provides a method and system for single-action ordering of items in a client/server environment. The single-action ordering system of the present invention reduces the number of purchaser interactions needed to place an order and reduces the amount of sensitive information that is transmitted between a client system and a server system. In one embodiment, the server system assigns a unique client identifier to each client system. The server system also stores purchaser-specific order information for various potential purchasers. The purchaser-specific order information may have been collected from a previous order placed by the purchaser. The server system maps each client identifier to a purchaser that may use that client system to place an order. The server system may map the client identifiers to the purchaser who last placed an order using that client system. When a purchaser wants to place an order, the purchaser uses a client system to send the request for information describing the item to be ordered along with its client identifier. The server system determines whether the client identifier for that client system is mapped to a purchaser. If so mapped, the server system determines whether single-action ordering is enabled for that purchaser at that client system. If enabled, the server system sends the requested information (e.g., via a Web page) to the client computer system along with an indication of the single action to perform to place the order for the item. When single-action ordering is enabled, the purchaser need only perform a single action (e.g., click a mouse button) to order the item. When the purchaser performs that single action, the client system notifies the server system. The server system then completes the order by adding the purchaser-specific order information for the purchaser that is mapped to that client identifier to the item order information (e.g., product identifier and quantity). Thus, once the description of an item is displayed, the purchaser need only take a single action to place the order to purchase that item. Also, since the client identifier identifies purchaser-specific order information already stored at is the server system, there is no need for such sensitive information to be transmitted via the Internet or other communications medium.

Figure 1A:
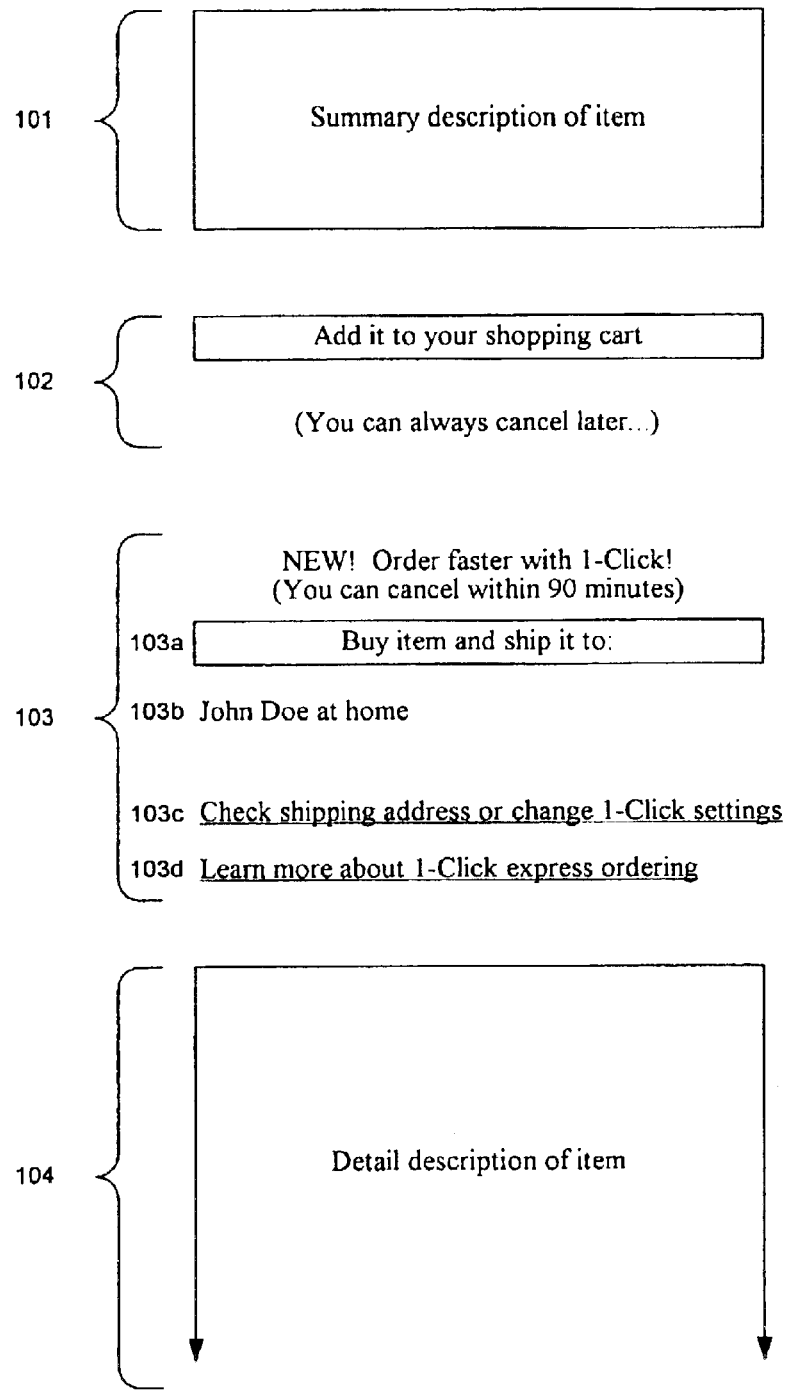
Figure 1B:
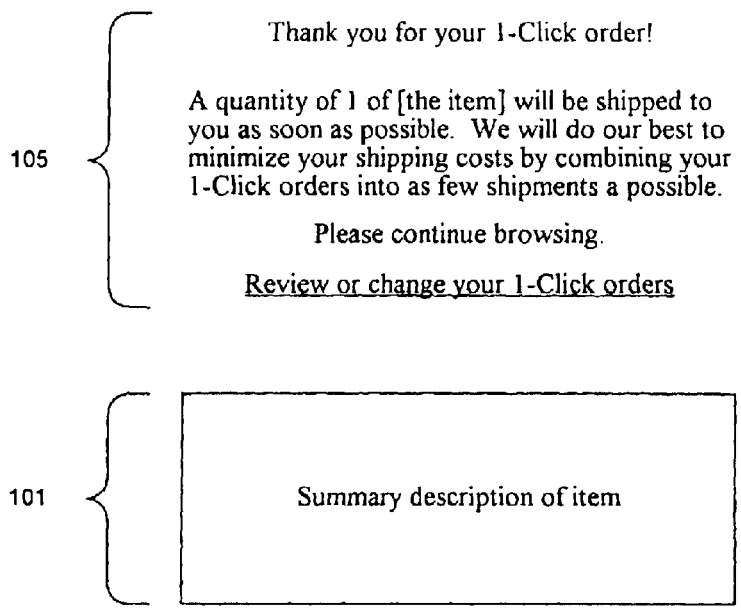

FIGS. 1A–1C illustrate single-action ordering in one embodiment of the present invention. FIG. 1A illustrates the display of a Web page describing an item that may be ordered. This example Web page was sent from the server system to the client system when the purchaser requested to review detailed information about the item. This example Web page contains a summary description section 101, a shopping cart section 102, a single-action ordering section 103, and a detailed description section 104. One skilled in the art would appreciate that these various sections can be omitted or rearranged or adapted in various ways. In general, the purchaser need only be aware of the item or items to be ordered by the single action and of the single action needed to place the order. The summary description and the detailed description sections provide information that identifies and describes the item(s) that may be ordered. The shopping cart section provides the conventional capability to add the described item to a shopping cart. The server system adds the summary description, the detailed description, and the shopping cart sections to each Web page for an item that may be ordered. The server system, however, only adds the single-action ordering section when single-action ordering is enabled for that purchaser at that client system. (One skilled in the art would appreciate that a single Web page on the server system may contain all these sections but the single-action ordering section can be selectively included or excluded before sending the Web page to the client system.) This example single-action ordering section allows the purchaser to specify with a single click of a mouse button to order the described item. Once the purchaser clicks the mouse button, the item is ordered, unless the purchaser then takes some action to modify the order. The single-action ordering section contains a single-action ordering button 103a, purchaser identification subsection 103b, and single-action ordering information subsections 103c and 103d. The purchaser information subsection displays enough information so that the purchaser can verify that the server system correctly recognizes the purchaser. To reduce the chances of sensitive information being intercepted, the server system sends only enough information so that the purchaser is confident that the server system correctly identified the purchaser but yet not enough information to be useful to an unscrupulous interceptor. The additional information subsections allow the purchaser to obtain various settings or obtain more information related to the single-action ordering. If the purchaser wants to verify the shipping address, the purchaser can select the "check shipping address" label. In response to this selection, the server system may require the purchaser to perform a "login" so that the identity of the purchaser can be verified before the shipping information is viewed or modified. The server system then sends a Web page to the client system for display and possible modification of the shipping address. In this way, the transmitting of the sensitive shipping address can be avoided unless requested by the verified purchaser.

When the purchaser selects the single-action ordering button, the client system sends a message to the server system requesting that the displayed item be ordered. After the server system processes the message, the server system provides to the client system a new Web page that confirms receipt of the single-action order. FIG. 1B illustrates the display of a Web page confirming a single-action order. The confirming Web page contains essentially the same information as the Web page describing the item (i.e., FIG. 1A) except that an order confirmation section 105 is displayed at the top of the Web page. The order confirmation section confirms that the order has been placed and provides an opportunity for the purchaser to review and change the single-action order. Alternatively, the confirming Web page can be identical to the Web page to describing the item (i.e., FIG. 1A), except that the single-action ordering button is replaced with a message confirming the order.

If a single-action ordering is not currently enabled for the client system but could be enabled, then the server system can generate a Web page like FIG. 1A, except that the single-action ordering button 103a is replaced by a single-action ordering enable button. Such a replacement button could contain text instructing the purchaser to click on the button to enable single-action ordering. When the purchaser clicks on that button, the server system would send the Web page of FIG. 1A to be displayed. Single-action ordering can be enabled whenever the server system has stored sufficient purchaser-specific order information for that client system to complete a single-action order. If the server system does not have sufficient information, then when the purchaser selects the single-action ordering button, the server system can provide a Web page to collect the additional information that is needed. The server system may require the purchases to "login" so that the identity of the purchaser can be verified before the single-action ordering is enabled.

To help minimize shipping costs and purchaser confusion, the server system may combine various single-action orders into a multiple-item order. For example, if a purchaser orders one item using the single-action ordering and five minutes later orders another item using the single-action ordering, then those orders may be cost effectively combined into a single order for shipping. The server system combines the single-action orders when their expected ship dates are similar. For example, if one item is immediately available and the other item will be available in one day, then the two single-action orders may be cost-effectively combined. However, if the other item will not be available for two weeks, then the two single-item orders would not be combined. FIG. 1C illustrates the display of a Web page representing four single-action orders that have been combined into two separate multiple-item orders based on the availability of the items. The order information 106 indicates that item 1 and item 2, which will be available in three or fewer days, have been combined into one order. The order information 107 indicates that items 3 and 4, which will not be available within one week, are combined into a separate order. In one embodiment, the server system may combine single-action orders that are placed within a certain time period (e.g., 90 minutes). Also, the server system may combine or divide orders when the orders are scheduled for shipment based on the then current availability of the items ordered. This delayed modification of the orders is referred to as "expedited order selection" and is described below in detail.

Figure 2:
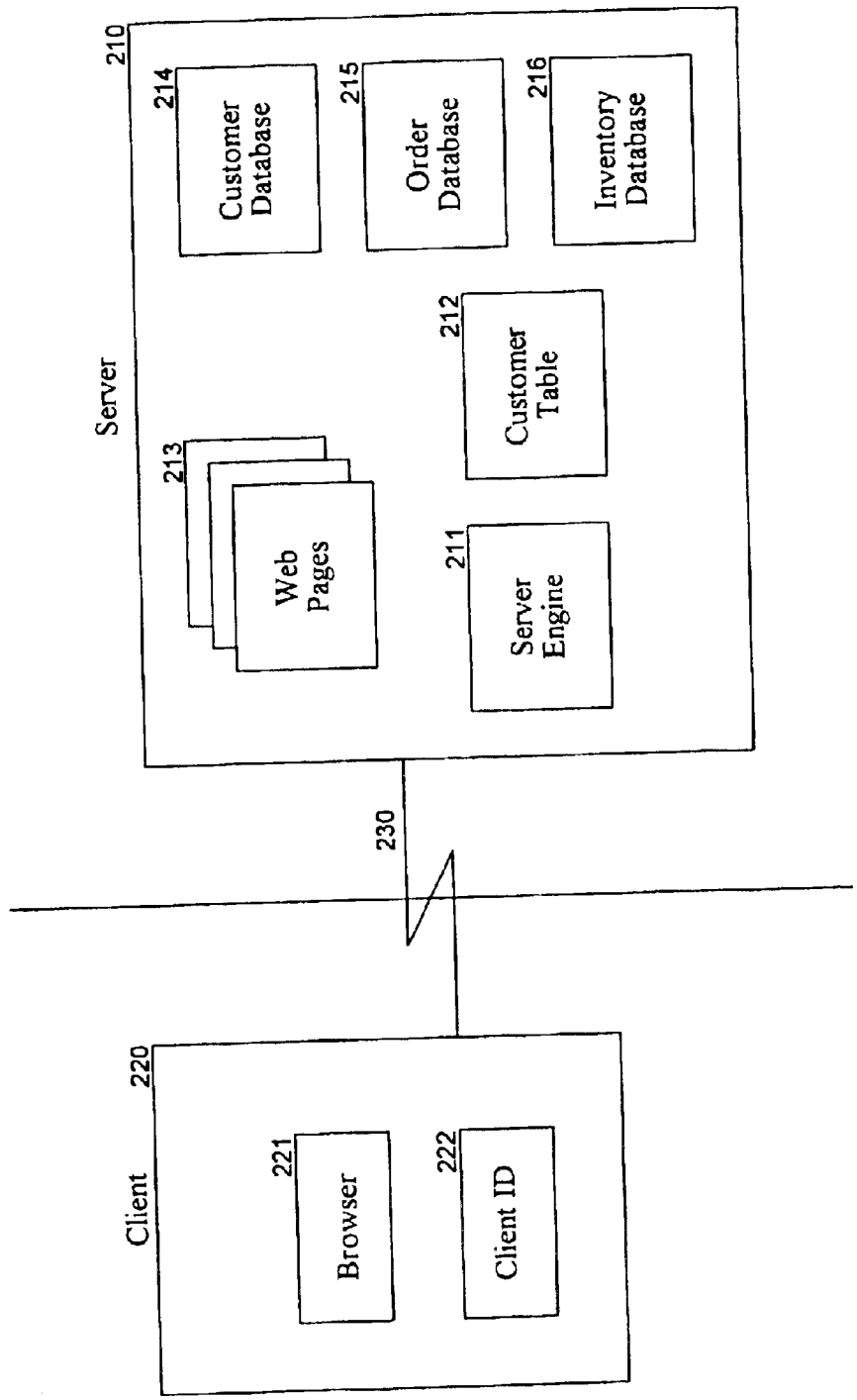
FIG. 2 is a block diagram illustrating an embodiment of the present invention.

FIG. 2 is a block diagram illustrating an embodiment of the present invention. This embodiment supports the single-action ordering over the Internet using the World Wide Web. The server system 210 includes a server engine 211, a client identifier/customer table 212, various Web pages 213, a customer database 214, an order database 215, and an inventory database 216. The server engine receives HTTP requests to access Web pages identified by URLs and provides the Web pages to the various client systems. Such an HTTP request may indicate that the purchaser has performed the single action to effect single-action ordering. The customer database contains customer information for various purchasers or potential purchasers. The customer information includes purchaser-specific order information such as the name of the customer, billing information, and shipping information. The order database 215 contains an entry for each order that has not yet been shipped to a purchaser. The inventory database 216 contains a description of the various items that may be ordered. The client identifier/customer table 212 contains a mapping from each client identifier, which is a globally unique identifier that uniquely identifies a client system, to the customer last associated with that client system. The client system 220 contains a browser and its assigned client identifier. The client identifier is stored in a file, referred to as a "cookie." In one embodiment, the server system assigns and sends the client identifier to the client system once when the client system first interacts with the server system. From then on, the client system includes its client identifier with all messages sent to the server system so that the server system can identify the source of the message. The server and client systems interact by exchanging information via communications link 230, which may include transmission over the Internet.

One skilled in the art would appreciate that the single-action ordering techniques can be used in various environments other than the Internet. For example, single-action ordering can also be in an electronic mail environment in which an item is described in an electronic mail message along with an indication of the single action that is to be performed to effect the ordering of the item. Also, various communication channels may be used such as local area network, wide area network, or point-to-point dial up connection. Also, a server system may comprise any combination of hardware or software that can generate orders in response to the single action being performed. A client system may comprise any combination of hardware or software that can interact with the server system. These systems may include television-based systems or various other consumer products through which orders may be placed.

Figure 3:
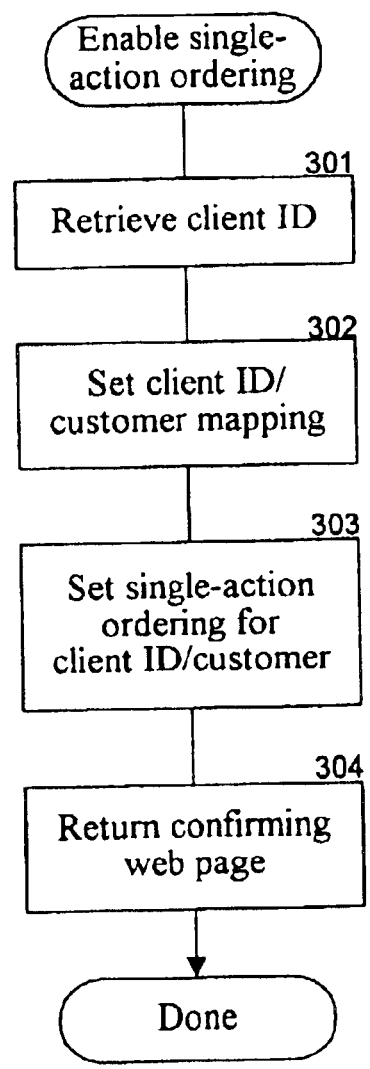
FIG. 3 is a flow diagram of a routine that enables single-action ordering for a customer.

FIG. 3 is a flow diagram of a routine that enables single-action ordering for a customer. To enable single-action ordering, a server system needs to have information about the customer that is equivalent to the purchaser-specific order information. The server system can obtain this information in various ways. First, the server system could ask the customer if they would like to have single-action ordering enabled. If so, then the server system could prompt the customer using a Web page for the purchaser-specific order information. Second, the server system could also save the purchaser-specific order information collected when an order is placed conventionally. The server system could, either automatically or with the customer's assent, enable single-action ordering. In step 301, the server system retrieves the client identifier that was sent by the client system. In step 302, the server system updates the client identifier/customer table to indicate that the generated client identifier has been associated with that customer. In step 303, the server system sets a flag indicating that single-action ordering is enabled for that client identifier and that customer combination. That flag may be stored in the client identifier/customer table. In step 304, the server system supplies a confirming Web page to the client system. The next time a purchaser attempts to order an item, the client system will supply its client identifier to the server system. If single-action ordering is enabled for that purchaser, the server system will assume that the purchaser is the customer associated with that client identifier in the client identifier/customer table. Thus, a purchaser may not want to allow the server system to enable single-action ordering if there is a possibility that someone else may use that same client system.

Figure 4:
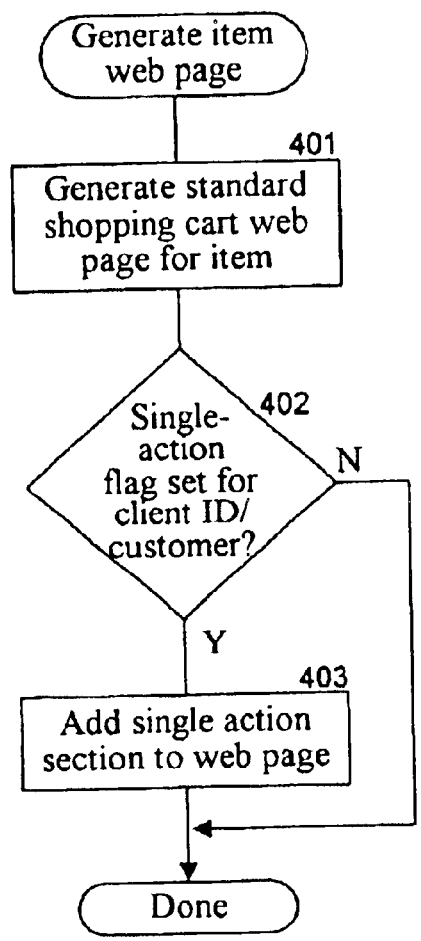
FIG. 4 is a flow diagram of a routine to generate a Web page in which single-action ordering is enabled.

FIG. 4 is a flow diagram of a routine to generate a Web page in which single-action ordering is enabled. When single-action ordering is enabled, the server system generates a Web page describing an item as is conventionally done and then adds a single-action ordering section. In one embodiment, the server system adds partial purchaser-specific order information to the section. This information may include the customer's name, a shipping address moniker selected by the purchaser (e.g., "at home"), and the last five digits of a credit card number or a nickname selected by the purchaser. Such partial information should be the minimum information sufficient to indicate to the purchaser whether or not the server system is using the correct purchaser-specific order information. In step 401, the server system generates a standard shopping cart-type Web page for the item. In step 402, if the single-action ordering flag has been set for the client identifier and customer combination, then the server system continues at step 403, else the server system completes. In step 403, the server system adds the single-action section to the Web page and completes.

Figure 5:
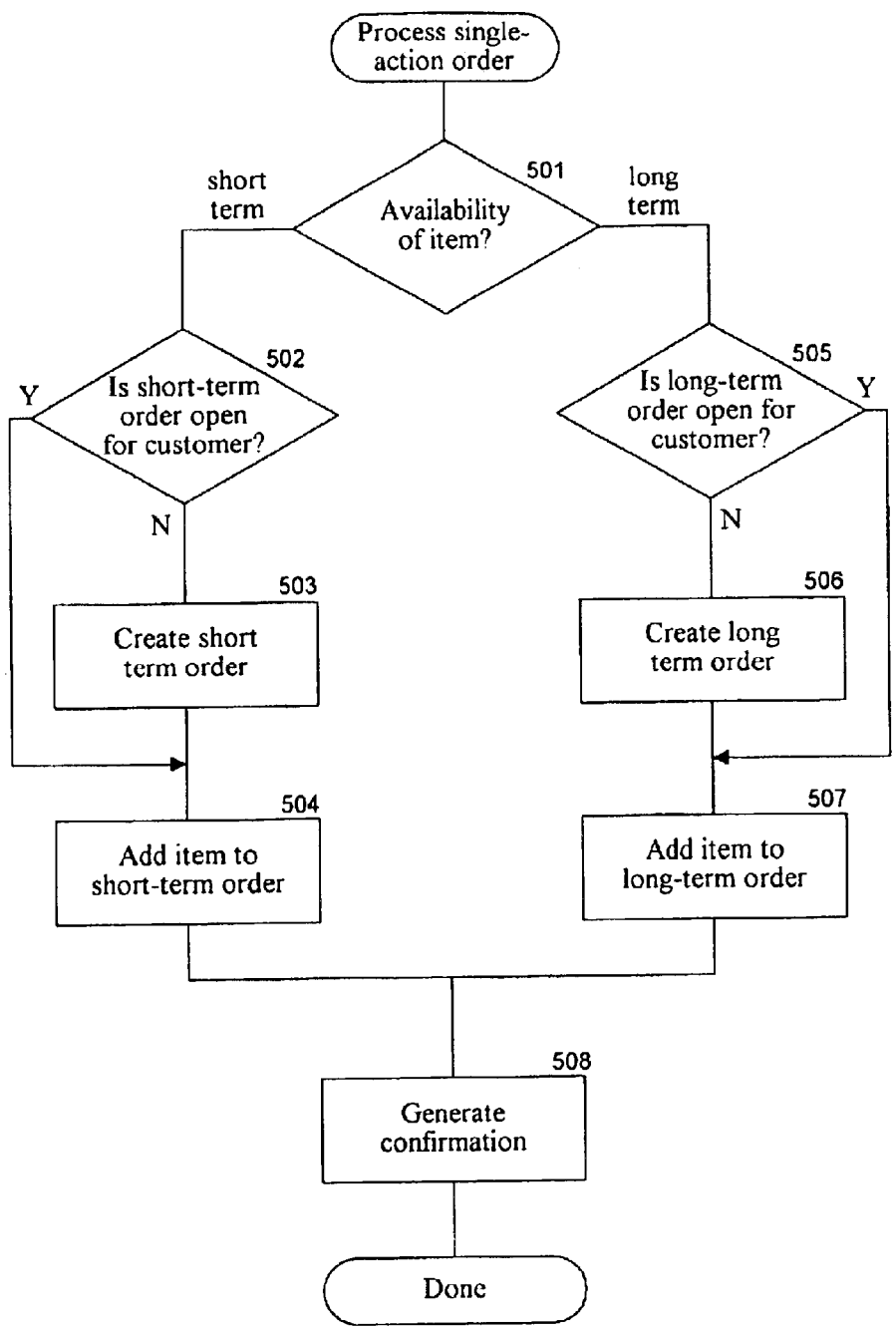
FIG. 5 is a flow diagram of a routine which processes a single-action order.

FIG. 5 is a flow diagram of a routine which processes a single-action order. When a purchaser performs the single action needed to place an order, the client system notifies the server system. The server system then combines the purchaser-specific order information for the customer associated with the client system with the item order information to complete the order. The single-action order may also be combined with other single-action orders and possibly with other conventionally placed orders to reduce shipping costs. In one embodiment, single-action orders can be combined if they are placed within a certain time period of each other (e.g., 90 minutes). This routine illustrates the combining of the single-action orders into a short-term order (e.g., available to be shipped in less than a week) and a long-term order (e.g., available to be shipped in more than a week). One skilled in the art would appreciate that the single-action orders can be combined in various ways based on other factors, such as size of shipment and intermediate-term availability. In step 501, if the item is expected to be shipped in the short term, then the server system continues at step 502, else the server system continues at step 505. In step 502, if a short-term order has already been opened for the purchaser, then the server system continues at step 504, else the server system continues at step 503. In step 503, the server system creates a short-term order for the purchaser. In step 504, the server system adds the item to the short-term order and continues at step 508. In step 505, if a long-term order has already been opened for the purchaser, then the server system continues at step 507, else the server system continues at step 506. In step 506, the server system creates a long-term order for the purchaser. In step 507, the server system adds the item to the long-term order. In step 508, the server system generates and sends the confirmation and completes.

Figure 6:
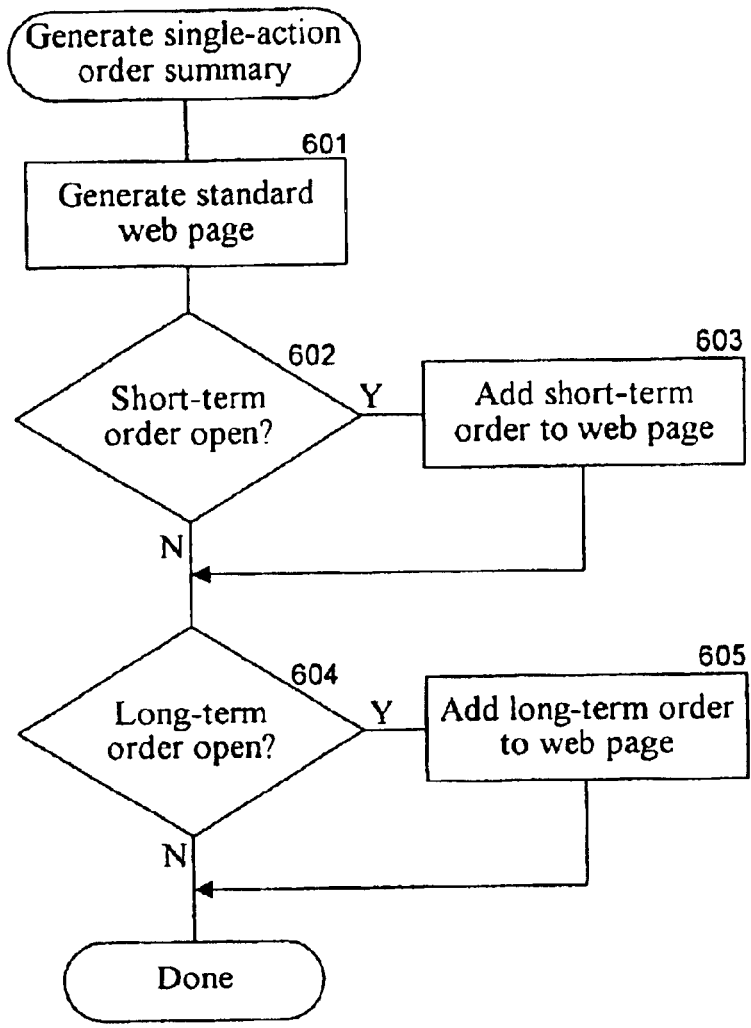
FIG. 6 is a flow diagram of a routine for generating a single-action order summary Web page.

FIG. 6 is a flow diagram of a routine for generating a single-action order summary Web page. This Web page (e.g., FIG. 1C) gives the user the opportunity to view and modify the short-term and long-term single-action orders. In step 601, the server system adds the standard single-action order information to the Web page. In step 602, if a short-term order is open, then the server system adds the short-term order to the Web page in step 603. In step 604, if a long-term order is open, then the server system adds the long-term order information to the Web page in step 605 and completes.

Figure 7:
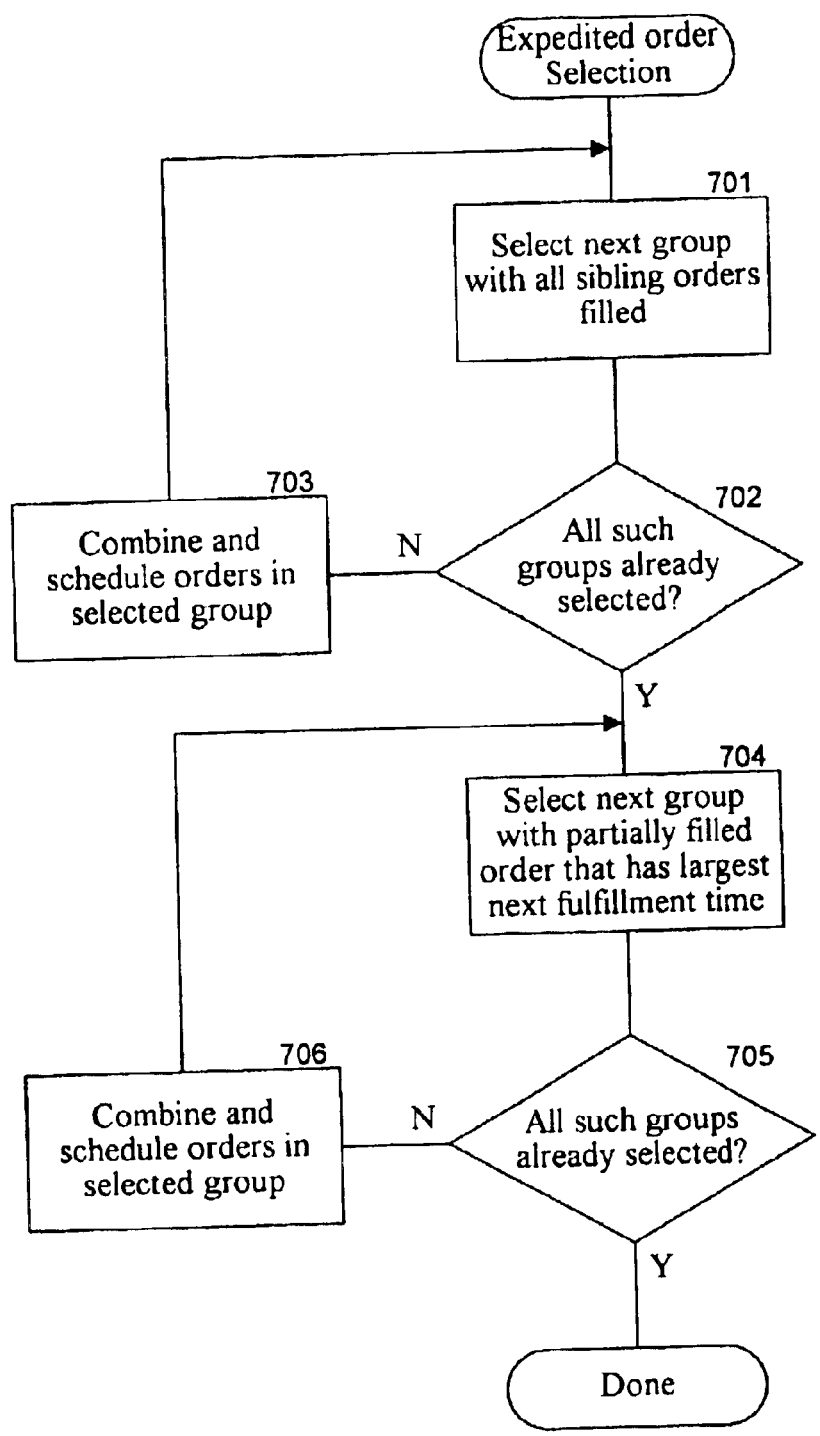
FIG. 7 is a flow diagram of a routine that implements an expedited order selection algorithm.

FIG. 7 is a flow diagram of a routine that implements an expedited order selection algorithm. The goal of the expedited order selection algorithm is to minimize the number of orders sent to each destination so that shipping costs are reduced. A destination may be a specific shipping address plus a specific purchaser's billing details. Orders that are sent to the same destination are known as "sibling orders." The algorithm has two stages. In the first stage, the algorithm schedules for shipment the orders for destinations for which all the sibling orders are filled. An order is filled when all its items are currently in inventory (ie., available) and can be shipped. For each group of sibling orders, the algorithm combines those sibling orders into a single combined order so that only one order is currently scheduled for shipment to each destination. In the second stage, the algorithm combines and schedules groups of sibling orders for which some of the sibling orders are not filled or partially filled. The algorithm may split each partially filled sibling order into a filled sibling order and a completely unfilled sibling order. The algorithm then combines all the filled sibling orders into a single combined order and schedules the combined order for shipment. If any group has only one sibling order and that order is partially filled, then the algorithm in one embodiment does not split that order to avoid making an extra shipment to that destination.

During the second stage, the algorithm may select and schedule groups of sibling orders in a sequence that is based on the next fulfillment time for an item in the group. The next fulfillment time for a group of sibling orders is the minimum expected fulfillment time of the items in that group of sibling orders. For example, if a group of sibling orders has seven items that are not yet fulfilled and their expected fulfillment times range from 3 days to 14 days, then the next fulfillment time for that group is 3 days. The algorithm first schedules those groups of sibling orders with the largest next fulfillment time. For example, if 6 groups have next fulfillment times of 3, 5, 7, 10, 11, and 14 days, respectively, then the algorithm first selects and schedules the sibling orders in the group with the next fulfillment time of 14 days, followed by the group with the next fulfillment time of 11 days, and so on. By delaying the scheduling of groups with short next fulfillment times, the algorithm increases the chances of additional items becoming available (because of the shortness of the next fulfillment time) and thus combined with the scheduled order.

Steps 701–703 represent the first stage of the expedited order selection algorithm, and steps 704–706 represent the second stage of the expedited selection order algorithm. In steps 701–703, the algorithm loops selecting groups in which all sibling orders are filled and combining the orders.

In step 701, the algorithm selects the next group with all sibling orders that are filled. In step 703, if all such groups have already been selected, then the algorithm continues with the second stage in step 704, else the algorithm continues at step 703. In step 703, the algorithm combines and schedules the orders in the selected group and loops to step 701. In step 704, the algorithm selects the next group of sibling orders that has the largest next fulfillment time. In step 705, if all such groups have already been selected, then the algorithm is done, else the algorithm continues at step 706. In step 706, the algorithm combines and schedules the orders in the selected group and loops to step 704. When the expedited order selection algorithm is being performed, new orders and new inventory may be received. Whenever such new orders and new inventory is received, then the algorithm restarts to schedule and combine the new orders as appropriate.

Although the algorithm has been described as having two stages, it could be implemented in an incremental fashion where the assessment of the first and second stages are redone after each order is scheduled. One skilled in the art would recognize that there are other possible combinations of these stages which still express the same essential algorithm.

FIGS. 8A–8C illustrate a hierarchical data entry mechanism in one embodiment. When collecting information from a user, a Web page typically consists of a long series of data entry fields that may not all fit onto the display at the same time. Thus, a user needs to scroll through the Web page to enter the information. When the data entry fields do not fit onto the display at the same time, it is difficult for the user to get an overall understanding of the type and organization of the data to be entered. The hierarchical data entry mechanism allows a user to understand the overall organization of the data to be entered even though the all data entry fields would not fit onto the display at the same time. FIG. 8A illustrates an outline format of a sample form to be filled in. The sample form contains various sections identified by letters A, B, C, and D. When the user selects the start button, then section A expands to include the data entry fields for the customer name and address. FIG. 8B illustrates the expansion of section A. Since only section A has been expanded, the user can view the data entry fields of section A and summary information of the other sections at the same time. The user then enters data in the various data entry fields that are displayed. Upon completion, the user selects either the next or previous buttons. The next button causes section A to be collapsed and section B to be expanded so that financial information may be entered. FIG. 8C illustrates the expansion of section B. If the previous button is selected, then section A would collapse and be displayed as shown in FIG. 8A. This collapsing and expanding is repeated for each section. At any time during the data entry, if an error is detected, then a Web page is generated with the error message in close proximity (e.g., on the line below) to the data entry field that contains the error. This Web page is then displayed by the client system to inform the user of the error. In addition, each of the data "entry" fields may not be editable until the user clicks on the data entry field or selects an edit button associated with the data entry field. In this way, the user is prevented from inadvertently changing the contents of an edit field. When the user clicks on a data entry field, a new Web page is presented to the user that allows for the editing of the data associated with the field. When editing is complete, the edited data is displayed in the data "entry" field. Because the fields of the form are thus not directly editable, neither "named-submit" buttons nor Java are needed. Also, the form is more compact because the various data entry options (e.g., radio button) are displayed only on the new Web page when the field is to be edited.

Although the present invention has been described in terms of various embodiments, it is not intended that the invention be limited to these embodiments. Modification within the spirit of the invention will be apparent to those skilled in the art. For example, the server system can map a client identifier to multiple customers who have recently used the client system. The server system can then allow the user to identify themselves by selecting one of the mappings based preferably on a display of partial purchaser-specific order information. Also, various different single actions can be used to effect the placement of an order. For example, a voice command may be spoken by the purchaser, a key may be depressed by the purchaser, a button on a television remote control device may be depressed by the purchaser, or selection using any pointing device may be effected by the purchaser. Although a single action may be preceded by multiple physical movements of the purchaser (e.g., moving a mouse so that a mouse pointer is over a button), the single action generally refers to a single event received by a client system that indicates to place the order. Finally, the purchaser can be alternately identified by a unique customer identifier that is provided by the customer when the customer initiates access to the server system and sent to the server system with each message. This customer identifier could be also stored persistently on the client system so that the purchaser does not need to re-enter their customer identifier each time access is initiated. The scope of the present invention is defined by the claims that follow.

What is claimed is:

1. A method in a computing system for processing item orders, comprising:

receiving a plurality of orders, each order having a destination and one or more items;

organizing the received orders into order groups, the orders of each order group all having the same destination;

for each order group:
   determining an availability time for each item of each order of the order group indicating how far in the future the item will become available for shipment;
   if all of the items of all of the orders of the order group have an availability time of zero, combining all of the orders of the order group into a single composite order for shipment;
   if fewer than all of the items of all of the orders of the order group have an availability time of zero:
      combining all of the items of all of the orders of the order group having an availability time of zero into a first composite order for shipment, and
      combining all of the items of all of the orders of the order group having an nonzero availability time into a second composite order for shipment.

2. The method of claim 1 wherein the destination of each order is based upon a shipping address of the order.

3. The method of claim 1 wherein the destination of each order is based upon billing details of the order.

4. The method of claim 1 wherein the destination of each order is based upon both a shipping address of the order and billing details of the order.

5. A method in a computing system for combining item orders for shipment, comprising:

among a group of orders all having a common destination, each order of the group having one or more items, identifying zero or more orders of a first type whose items are all available for shipment, one or more orders of a second type having at least one item that is available for shipment and at least one item that is not available for shipment, and zero or more orders of a third type whose items are all not available for shipment;

for each order of the second type, splitting the order of the second type to obtain a first constituent order containing all of the items of the order of the second type that are available for shipment and a second constituent order containing all of the items of the order of the second type that are not available for shipment;

combining together for shipment the orders of the first type with the obtained first constituent orders; and combining together for shipment the orders of the third type with the obtained second constituent orders.

6. The method of claim 5 wherein orders of the second type are split only where the order group includes more than one order.

7. The method of claim 5, further comprising performing the method for each of a plurality of order groups.

8. The method of claim 7 wherein each of the plurality of order groups has a minimum expected fulfillment time, and wherein the method is performed for the order groups in declining order of their minimum expected fulfillment times.

9. A computer-readable medium whose contents cause a computing system to combine item orders for shipment by:

among a group of orders all having a common destination, each order of the group having one or more items, identifying zero or more orders of a first type whose items are all available for shipment, one or more orders of a second type having at least one item that is available for shipment and at least one item that is not available for shipment, and zero or more orders of a third type whose items are all not available for shipment;

for each order of the second type, splitting the order of the second type to obtain a first constituent order containing all of the items of the order of the second type that are available for shipment and a second constituent order containing all of the items of the order of the second type that are not available for shipment;

combining together for shipment the orders of the first type with the obtained first constituent orders; and combining together for shipment the orders of the third type with the obtained second constituent orders.

10. A method in a computing system for processing an item orders for shipment, comprising:

receiving a first order having a first item and a second item;

determining that the first item has an availability time similar to items in a second order, and that the second item has an availability time similar to items in a third order; and in response to the determination, adding the first item to the second order and adding the second item to the third order.

11. A computing system for processing an item orders for shipment, comprising:

an order receiver that receives a first order having a first item and a second item;

an availability determination subsystem that determines that the first item has a time-to-inventory similar to items in a second order, and that the second item a time-to-inventory similar to items in a third order; and an item reallocation subsystem that adds the first item to the second order and adds the second item to the third order in response to the determination by the availability determination subsystem.

12. A method in a computing system for combining item orders for shipment, comprising:

among a set of orders, each order having a destination and one or more items, identifying mutually-exclusive groups of orders such that the orders of each group all have the same destination;

for each group of orders whose items are all available for shipment:
combining the orders of the group, and
scheduling the combined orders of the group for shipment; and for each group of orders whose items are not all available for shipment:
combining the orders of the group, and
scheduling the combined orders of the group for shipment.

13. A method in a computing system for processing received orders for shipment, comprising:

receiving a plurality of orders, each order having a destination and one or more items;

organizing the received orders into order groups, the orders of each order group all having the same destination;

for each order group:
for each item of each order of the order group, determining an availability time for the item;
selecting the earliest availability time determined for an item of an order of the order group as an availability time for the order group; and processing the orders in the order groups for shipment in decreasing order of the earliest availability times selected for the order groups.

14. The method of claim 13 wherein processing an order group constitutes exchanging items between orders of the order group so that each order of the order group contains items all having approximately the same availability time.

15. The method of claim 13 wherein a first order group having a availability time later than a second order group is processed earlier than the second order group, the method further comprising:

at a time after the second order group is processed and before the first order group is processed, receiving a new order;

based upon the destination of the received new order, attributing the received new order to the first order group, such that the first order group includes the received new order at the time the first order group is processed.

16. A computer-readable medium whose contents cause a computing system to process received orders for shipment by:

receiving a plurality of orders, each order having a destination and one or more items;

identifying as sibling orders all orders having the same destination;

for each group of sibling orders:
for each item of each order of the group of sibling orders, determining an availability time for the item;
selecting the earliest availability time determined for an item of an order of the group of sibling orders as an availability time for the for the group of sibling orders; and processing the orders in the groups of sibling orders for shipment in decreasing order of the earliest availability times selected for the groups of sibling orders.

* * * * *

UNITED STATES PATENT AND TRADEMARK OFFICE
CERTIFICATE OF CORRECTION

PATENT NO. : 6,907,315 B1
DATED : June 14, 2005
INVENTOR(S) : Peri Hartman and John Gehlen It is certified that error appears in the above-identified patent and that said Letters Patent is hereby corrected as shown below:

Column 4,
Line 16, "already stored at is the server system" should be -- already stored at the server system --;

Column 5,
Line 21, "Web page to describing" should be -- Web page describing --.

Signed and Sealed this

Eighth Day of November, 2005

JON W. DUDAS
*Director of the United States Patent and Trademark Office*